United States Patent [19]
Tresser et al.

[11] Patent Number: 6,064,701
[45] Date of Patent: May 16, 2000

[54] SYNCHRONIZATION-BASED COMMUNICATION SYSTEMS

[75] Inventors: Charles Philippe Tresser, Mamaroneck; Chai Wah Wu, Ossining, both of N.Y.

[73] Assignee: International Business Machines Corporation, Armonk, N.Y.

[21] Appl. No.: 08/985,765

[22] Filed: Dec. 5, 1997

[51] Int. Cl.[7] ................................................... H04L 9/00
[52] U.S. Cl. .................... 375/285; 375/296; 375/346; 375/354; 380/28; 380/48
[58] Field of Search ................................ 380/28, 46, 48; 375/200, 259, 285, 295, 340, 346, 354, 377, 296

[56] References Cited

U.S. PATENT DOCUMENTS

| 5,680,462 | 10/1997 | Miller et al. | 380/48 |
| 5,729,607 | 3/1998 | DeFries et al. | 380/6 |
| 5,930,364 | 7/1999 | Kim | 380/28 |

OTHER PUBLICATIONS

L. Chua et al., "Synchronization of Chua's Circuits With Time–Varying Channels and Parameters", IEEE Transactions on Circuits and Systems, vol. 43, No. 10, Oct. 1996, pp. 862–868.

N. Corron et al., "A New Approach to Communications Using Chaotic Signals", IEEE Transactions on Circuits and Systems, vol. 44, No. 5, May 1997, pp. 373–382.

K. Cuomo et al., "Synchronization of Lorenz–BaSed Chaotic Circuits With Applications to Communications", IEEE Transactions on Circuits and Systems, vol. 40, No. 10, Oct. 1993, pp. 626–633.

L. Chua et al., "A Universal Circuit for Studying and Generating Chaos–Part I: Routes to Chaos", IEEE Transactions on Circuits and Systems, vol. 40. No. 10, Oct. 1993, pp. 732–744.

T. Matsumoto et al., "Double scroll Via a Two–Transistor Circuit", IEEE Transactions on Circuits and Systems, vol. CAS–33, No. 8, Aug. 1986, pp. 828–835.

C. Wu et al., "A Unified Framework for Synchronization and Control of Dynamical Systems", International Journal of Bifurcation and Chaos, vol. 4, No. 4, 1994, pp. 979–998.

M. Kennedy, "Robust OP Amp Realization of Chua's Circuit", Frequenz, vol. 46, 1992, pp. 66–80.

C. Tresser et al., "Resynchronizing Dynamical Systems", Physics Letters, vol. A229, 1997, 293–298.

*Primary Examiner*—Amanda T. Le
*Attorney, Agent, or Firm*—Whitham, Curtis & Whitham; Stephen C. Kaufman, Esq.

[57] ABSTRACT

An alternative to classical spread spectrum communication systems is based on synchronization of dynamical systems which can resist noisy transmission channels, jamming, gain modulation, multiple time delays, and self-jamming.

9 Claims, 7 Drawing Sheets

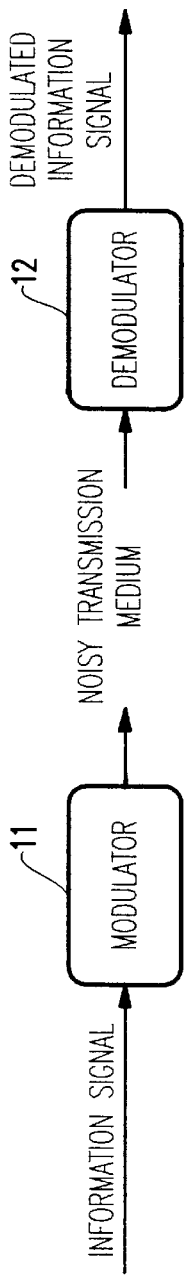
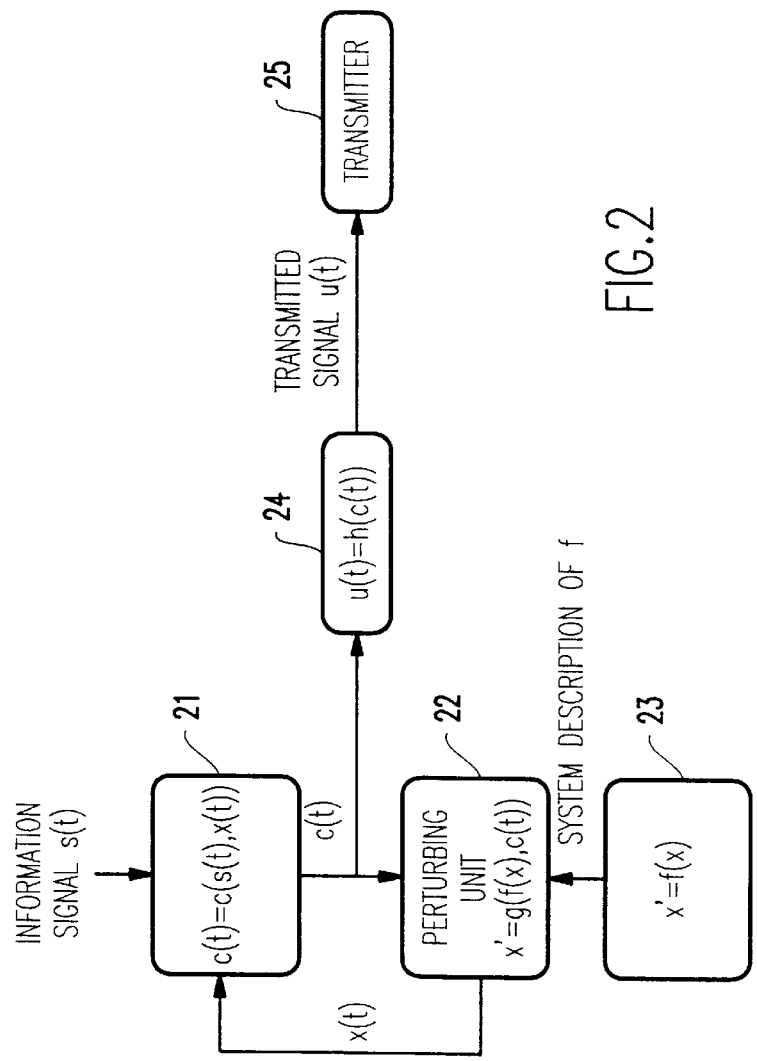

SYNCHRONIZATION-BASED COMMUNICATION SYSTEMS

BACKGROUND OF THE INVENTION

1. Field of the Invention

The present invention generally relates to synchronization-based communication systems and, more particularly, to communication systems based on synchronization of chaotic dynamical systems.

2. Background Description

The simplest communication systems consist of a transmitter and a receiver. Such a simple setup can only work if the communication medium does not alter the information signal. In most practical systems however, the communication medium alters the signal and introduce disturbances in a variety of ways. Examples of such practical systems include radio communications, television broadcasts, etc. In such cases, one or both ends of the communication system will need to be equipped with circuitry to overcome the problems caused by these disturbances.

The present invention relates to the problem of communication through noisy channels. A general method to allow transmitted signals to resist noise and other disturbances is spread spectrum communication, whose foundations lies in spectral analysis. This method appears in various forms with different levels of sophistication, depending for example on the signal to noise ratio (S/N) that the communication must accommodate in various settings (see for example, Robert C. Dixon, *Spread Spectrum Systems With Commercial Applications*, John Wiley & Sons, 1994, and Andrew J. Viterbi, *CDMA Principles of Spread Spectrum Communication*, Addison-Wesley, 1995). The basic idea is to spectrally spread a signal so that, even if the noise is at times very disturbing in some bands, enough of the information can be recovered.

The present invention offers an alternative to more classical spread spectrum communication techniques in settings where transmitted digital signals are recovered using correlation properties. The classical approach needs precise synchronization to be implemented in order to recognize binary sequences, and is heavily digital. The present invention has automatic synchronization built in, does not require correlation analysis (although correlators could be used as an alternative of or in combination with the proposed technique of demodulation), and is mostly analog, which allows higher coding frequencies. Nevertheless, the system is sufficiently digital to allow the quality of the detection to be enhanced by using error correcting codes.

SUMMARY OF THE INVENTION

It is therefore an object of the present invention to provide an alternative to classical spread spectrum communication systems which will work at higher frequencies than previous methods.

According to the invention, there is provided a communication system based on synchronization of dynamical systems which can resist noisy transmission channels, jamming, gain modulation, multiple time delays, and self-jamming.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram illustrating a simple communication system;

FIG. 2 is a block diagram illustrating the basic components of the modulator according to the invention;

DETAILED DESCRIPTION OF A PREFERRED EMBODIMENT OF THE INVENTION

Figure 3:
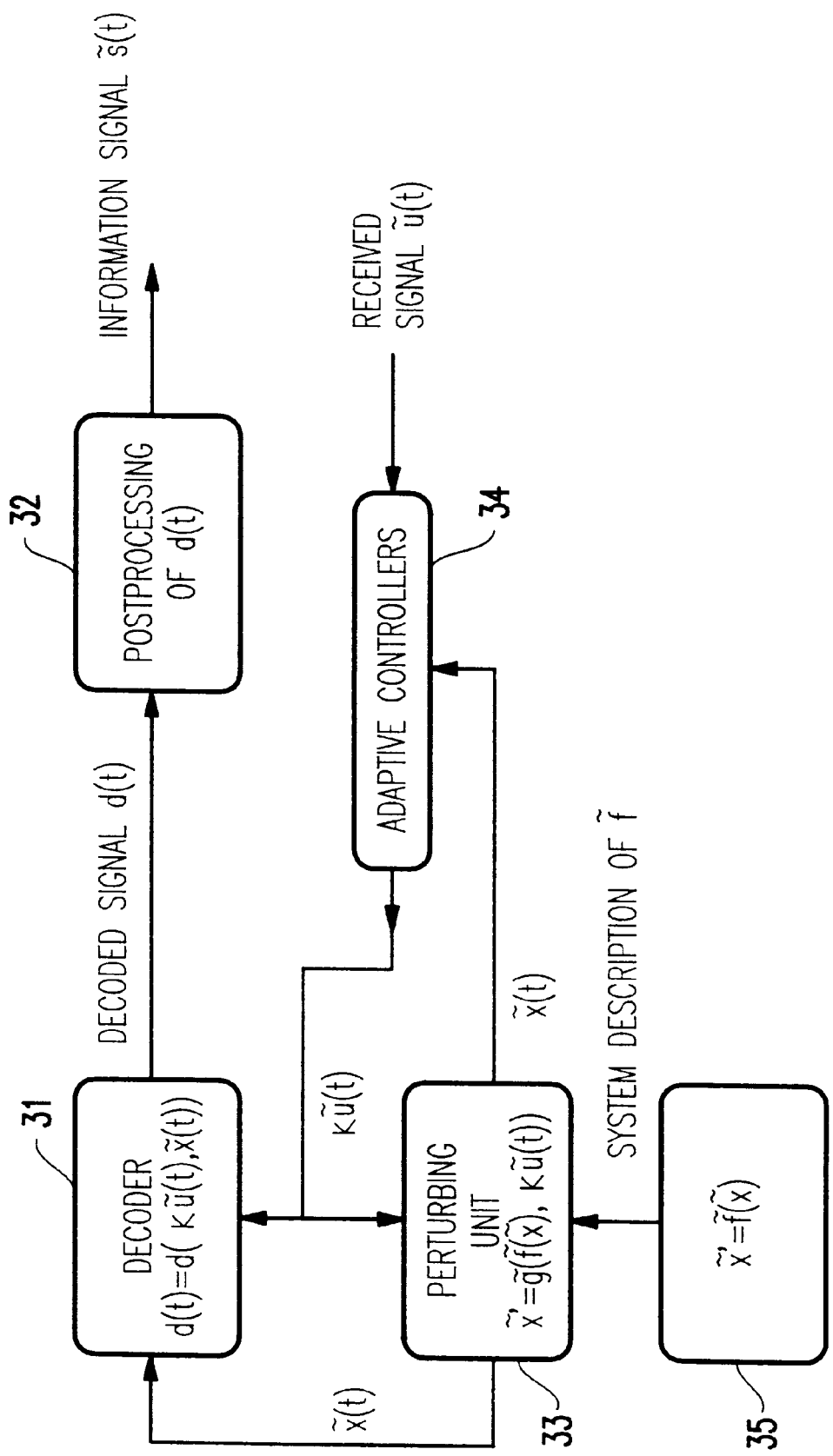
FIG. 3 is a block diagram illustrating the basic component of the demodulator according to the invention.

Referring now to the drawings, and more particularly to FIG. 1, there is shown a communication system for use in noisy channels in general consisting of a modulator 11 which transforms the information signal into a suitable form for transmission through a noisy medium and a demodulator 12 which decodes the modulated signal, corrupted by noise, to obtain the information signal.

Several applications of the use of synchronization of chaotic systems to implement secure communication systems have appeared in the literature (see for example K. M. Cuomo, A. V. Oppenheim and S. H. Strogatz, "Synchronization of Lorenz-based chaotic circuits with applications to communications", *IEEE Transactions on Circuits and Systems*, part II, vol. 40, pp. 626–633, 1993, and C. W. Wu, and L. O. Chua, "A unified framework for synchronization and control of dynamical systems", *International Journal of Bifurcation and Chaos*, vol. 4, no. 4, pp. 979–998, 1994). However, these systems suffer from severe degradation in noisy environments and poor signal to noise ratio. The aim of these uses of chaotic synchronization in communication was mostly secrecy, a goal not yet satisfactorily reached by such methods so that the noise resistance issues were not addressed by this series of work. To the contrary, the current invention is not at all concerned with secrecy, although some protection to eavesdropping might be obtained as a feature of the method, but rather addresses the general problem of resistance to noisy channels using chaotic synchronization.

Small aspects of the communication problem were recently addressed using chaotic synchronization in U.S. Pat. No. 5,291,555 to K. Cuomo and A. V. Oppenheim and U.S. Pat. No. 5,379,346 to L. M. Recora and L. Carroll. These inventions address communications in noisy channels but do not offer solutions to more complex communications problems as they appear in most practical applications. Also related is the paper by N. J. Corron and D. W. Hahs, "A new approach to communications using chaotic signals", *IEEE Transactions on Circuits and Systems*, I, vol. 44, no. 5, May 1997, pp. 373–382. There, the demodulation is done by a nonlinear filter to combat noise, but the general problem is so far untouched by their method.

Problems to be Solved

In practical implementations of a communication system, the signal transmitted is not identical to the signal received because of several sources of degradation occurring in the transmission process:

1. Channel noise.
2. Interference from other communication systems.
3. Multipath interference (seif-jamming) due to reflection from objects such as building walls and atmosphere.
4. Intentional noise sent by a third party with the intention of disrupting the communication system (jamming).
5. Channel nonidealities due to changes in the transmission medium over time. For example, the gain of the channel can fluctuate over time.

Furthermore, there are other noise introduced when one uses synchronization of chaos in communication system as described in previous art.

1. Noise due to parameter mismatch between the transmitter and receiver.
2. Noise due to large chaos-to-signal ratio (C/S).

These problems all occur in previous implementations of communication systems utilizing synchronization of chaotic systems.

We propose a communication system which reduces the degradation in signal fidelity due to these noise effects using techniques adapted from those used in classical spread spectrum communication systems.

Principles of the Invention

We describe dynamical systems as $x'=f(x)$ where $x'$ is equal to the value of $x$ in the next iteration in the case of discrete dynamical systems, and equal to the derivative of $x$ with respect to time, $t$, in the case of a continuous time dynamical system. The communication system in the invention consists of two parts: a modulator which transforms an information signal into modulated signals, and a demodulator which decodes the modulated signal to retrieve the information signal. A block diagram of the modulator is shown in FIG. 2.

With reference to FIG. 2, the modulator comprises a dynamical system $x'=f(x)$ generating signals $x(t)$ with prescribed characteristics, denoted by reference numeral 23. The output signals $x(t)$ are supplied to an encoder 21 for combining the information signal $s(t)$ (possibly after encoding with error correction codes) with $x(t)$ to produce an encoded signal $c(t)=c(s(t),x(t))$. A perturbing unit 22 changes the dynamical system $x'=f(x)$ according to $c(t)$ into the system $x'=g(f(x),c(t))$. In contrast to U.S. Pat. No. 5,291,555, the chaotic signal generator rather than the chaotic signal is perturbed. A transforming function $h$ maps $c(t)$ into a function $u(t)=h(c(t))$. The signal $u(t)$ is the signal that is transmitted to the receiver, as denoted in block 24. A transmitter 25 sends $u(t)$ to the receiver.

A block diagram of the demodulator at the receiver is shown in FIG. 3. The received signal $\tilde{u}(t)$ is input to adaptive controllers 34. Adaptive controllers 34 estimate and compensate for changes in the communication channel. The adaptive controllers 34 are only used when the transmitter is transmitting a preamble sequence. The preamble sequence is sent periodically to adjust the demodulator to changing channel conditions. The outputs of the adaptive controllers 34 are equal to $\kappa \tilde{u}$ during the time when the transmitter is not transmitting a preamble sequence. $\kappa$ is a constant. determined by the adaptive controller during the preamble period and is changed after each preamble period. A dynamical system 35 generates signals $\tilde{x}'=f(\tilde{x})$ which are similar to $x(t)$. Decoder 31 decodes the transmitted signal $\kappa \tilde{u}(t)$ (possibly corrupted by noise) using $\tilde{x}'(t)$ from the perturbing unit 33; i.e., the decoded signal is $d(t)=d(\kappa \tilde{u}(t),\tilde{x}(t))$. The perturbing unit 33 changes the dynamical system output $\tilde{x}'=\tilde{f}(\tilde{x})$ according to $\kappa \tilde{u}(t)$ into $\tilde{x}'=\tilde{g}(\tilde{f}(\tilde{x}),\kappa \tilde{u}(t))$.

This system is constructed such that the decoded signal $d(t)$ from decoder 31 approximates the signal $s(t)$, so the information in $s(t)$ can be recovered from $d(t)$. Additional post-processing of $d(t)$ might be needed to further reduce the effect of noise and nonidealities, as indicated in block 32. If error correction codes are used in the transmitter to generate $s(t)$, an additional post processing step would be necessary to do the corresponding decoding.

One feature of the invention is that the synchronization is automatic. When the signal is dropped for some reason, the system will resynchronize very quickly after re-establishing connection, and therefore error propagation is minimized or eliminated.

The present invention is novel in the following ways:

The coding function, c, is chosen to be similar to the coding function used in direct-sequence spread spectrum communication systems. This implies that the information signal is used in a more significant way than in previous designs and increases the system's tolerance to noise.

The use of an adaptive controller for chaotic dynamical systems in conjunction with a preamble sequence to estimate the gain of the channel during a preamble period.

The transmitted signal is not a state variable of the system or a perturbation of the state, but a strongly nonlinear function of the state of the system and of the information signal.

Description of a Specific Implementation

Figure 4:
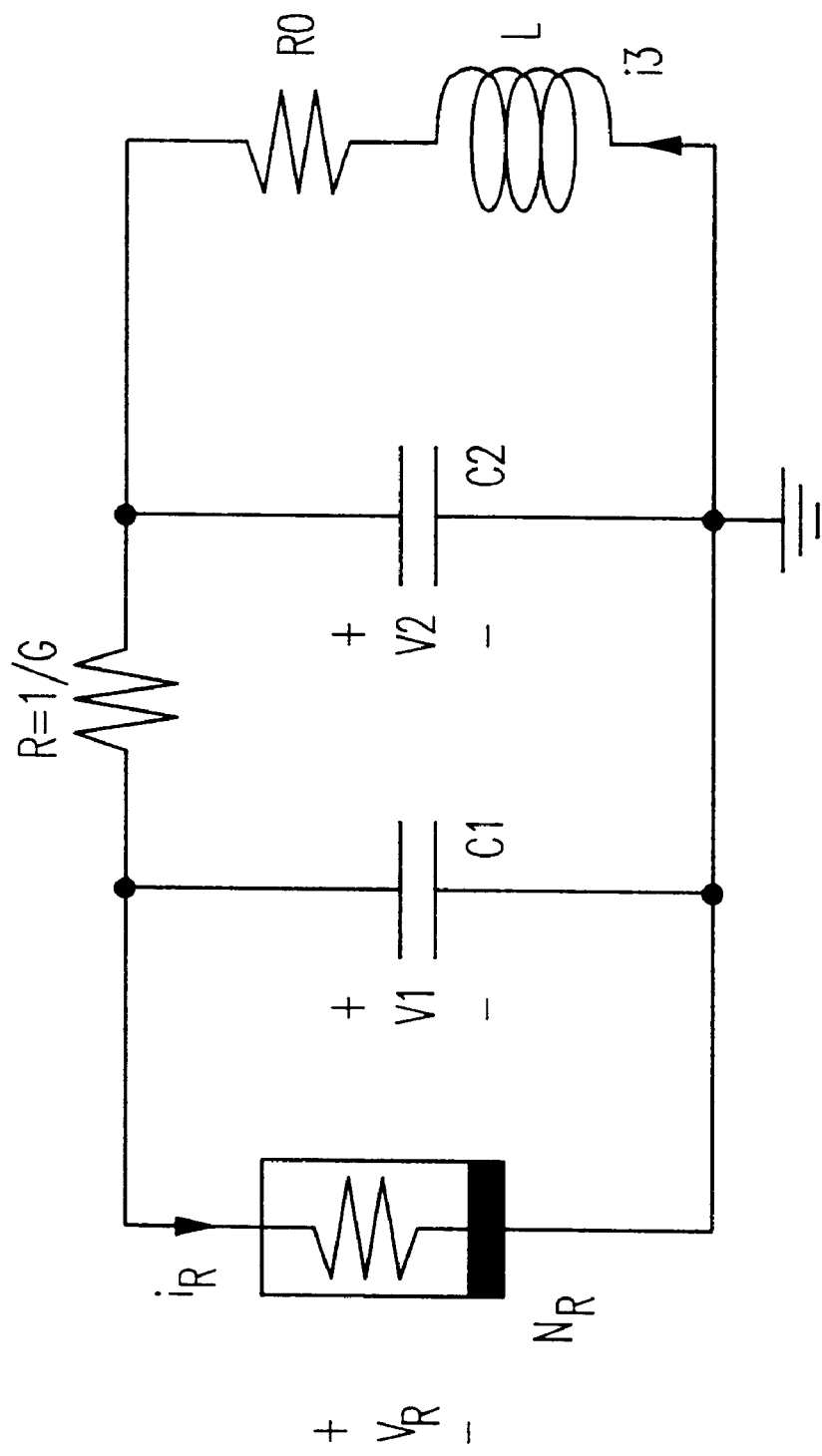
FIG. 4 is a schematic diagram of a Chua's oscillator as used in the invention.

We give here a detailed description of the components of the modulator and demodulator in a specific implementation. The dynamical system generating the signals $x(t)$ and $\tilde{x}(t)$ will be simple chaotic circuits, either the Lorenz system as described in *Lorenz Equations: Bifurcations, Chaos, and Strange Attractors*, Springer Verlag, by C. Sparrow (1983), or the Chua's oscillator as described in "A universal circuit for studying and generating chaos—part I: Routes to chaos", *IEEE Transactions on Circuits and Systems-I: Fundamental Theory and Applications*, vol. 40, pp. 732–744, October, 1993, by L. O. Chua, C. W. Wu, A. Huang and G-Q. Zhong. These systems are continuous time dynamical system and thus $x'$ represents the derivative of $x$ with respect to time, $t$. In this case we will rewrite $x'$ as $\dot{x}$. The Chua's oscillator is shown in FIG. 4.

We choose Chua's oscillator in the specific implementation because of its simple construction using electronic components. The Lorenz system has the desirable property that it is resynchronizable (see, for example, C. Tresser and P. A. Worfolk, "Resynchronizing dynamical systems", *Physics Letters A*, vol. 229, pp. 293–298, 1997) and can be used if higher performance is desired, but will result in a more complicated electronic implementation. The implementation using the Lorenz system can be derived from this disclosure by anyone skilled in the art.

Chua's oscillator comprises two linear capacitors, two linear resistors, $C_1$ and $C_2$, one linear inductor, L, and one nonlinear resistor, $N_R$. The nonlinear resistor can be constructed using operational amplifiers, transistors or other techniques (see, for example, M. P. Kennedy, "Robust OP amp realization of Chua's circuit", *Frenquenz, vol.* 46, no. 3–4, pp. 66–80, 1992, and T. Matsumoto, L. O. Chua and K Tokumasu, "Double Scroll via a two-transistor circuit", *IEEE trans. on Circuits and Systems*, vol. CAS-33, no. 8, pp. 828–835, 1986). The nonlinear resistor in Chua's oscillator is an active element; it generates power. In practical implementation, this is supplied by an external energy source such as a battery. Roughly speaking, Chua's oscillator is a nonlinear oscillator. It can he decomposed into two parts: the active nonlinear resistor and a second-order linear circuit consisting of all the linear components. The active nonlinear resistor acts as a signal generator which drives the linear subcircuit. Of course, because of the coupling, the signal generated by the nonlinear resistor is not independent but is coupled with the entire circuit. The resulting oscillation can be periodic or chaotic, depending on the parameters of the circuit components. we are interested in using Chua's oscillator when it is generating chaotic oscillations.

The following dimensionless ordinary differential equations are used to describe the specific implementation, both in the modulator and the demodulator:

$$\dot{x} = \alpha(y - f(x)) \quad (1)$$

$$\dot{y} = x - y + z$$

$$\dot{z} = -\beta y - \gamma z$$

$$f(x) = bx + \frac{1}{2}(a - b)\,[|x+1| - |x-1|]$$

The parameters for both the modulator and demodulator are given by $\alpha=9$, $\beta=14$, $\gamma=0.001$, $a=-1.14$, and $b=-0.714$.

We will first describe the modulator in detail. The information signal s(t) can be either an analog signal or a digital signal, although a digital signal is preferred for robustness in noisy environments. The digital signal can be encoded with traditional error-correcting codes for added robustness to noise. Let s(t) be a digital signal; i.e., $s(t)\in\{0,1\}$ for all t. The encoder function c is defined as: $c(s,x)=s_0 x$ if $s=0$, and $c(s,x)=s_1 x$ if $s=1$. This encoding is similar to the direct-sequence encoding used in spread spectrum communication systems (see, for example, the book by Robert C. Dixon mentioned previously) and the overall system inherits some of the advantages of spread spectrum communication systems. The numbers $s_0$ and $s_1$ are two nonzero constants which in the preferred embodiment are equal to 1.0 and 1.15, respectively. One of the novel features of this invention is this choice of c which changes the state of the chaotic system much more significantly than the signal masking schemes used in the prior art (where $c(s,x)=x+\delta s$ is used with $\delta$ small). This results in higher tolerance to noise.

The perturbing unit takes $c(t)=c(s,x)$ and acts on Chua's oscillator (Equation (1)) in the following way:

$$\dot{x} = \alpha(y - x - f(c(t)))$$

$$\dot{y} = x - y + z$$

$$\dot{z} = -\beta y - \gamma z$$

$$f(x) = bx + \frac{1}{2}(a - b)\,[|x+1| - |x-1|]$$

The signal c(t) is then transformed into the transmitted signal u(t) via the transforming function h which in the specific implementation is equal to f. In other words, $u(t)=f(c(t))$.

The signal u(t) is then transmitted to the receiver. Because of noise in the channel, the receiver will receive a corrupted version of u(t), which we denote as $\tilde{u}(t)$.

Next we describe the demodulator in detail. The chaotic circuit in the demodulator is the same as the modulator (i.e., Chua's oscillator):

$$\dot{\tilde{x}} = \alpha(\tilde{y} - \tilde{x} - \tilde{f}(\tilde{x})) \quad (2)$$

$$\dot{\tilde{y}} = \tilde{x} - \tilde{y} + \tilde{z}$$

$$\dot{\tilde{z}} = -\beta\tilde{y} - \gamma\tilde{z}$$

$$f(\tilde{x}) = b\tilde{x} + \frac{1}{2}(a - b)\,[|\tilde{x}+1| - |\tilde{x}-1|]$$

with $\alpha$, $\beta$, $\gamma$, a, and b the same as in the modulator. In a physical implementation, these parameters will not be exactly the same as in the modulator.

The decoding function d will be $$d(t) = d(\kappa\tilde{u}(t), \tilde{x}(t)) = \begin{cases} \dfrac{f^{-1}(\kappa\tilde{u}(t))}{\tilde{x}} & |\tilde{x}| > \epsilon \\ \dfrac{\text{sign}(\tilde{x})f^{-1}(\kappa\tilde{u}(t))}{\epsilon} & \text{otherwise} \end{cases}$$

for some small positive number $\epsilon>0$.

The perturbing unit will use $\tilde{u}(t)$ and perturb the dynamical system (Equation (2)) into:

$$\dot{\tilde{x}} = \alpha(\tilde{y} - \tilde{x} - \kappa\tilde{u}(t))$$

$$\dot{\tilde{y}} = \tilde{x} - \tilde{y} + \tilde{z}$$

$$\dot{\tilde{z}} = -\beta\tilde{y} - \gamma\tilde{z}$$

$$f(\tilde{x}) = b\tilde{x} + \frac{1}{2}(a - b)\,[|\tilde{x}+1| - |\tilde{x}-1|]$$

The value of $\kappa$ is used to compensate for the possible nonunity gain in the channel. The adaptive controller for $\kappa$ is given by:

$$\dot{\kappa} = -w(\kappa\tilde{u} - f(\tilde{x}))\tilde{u},$$

for some positive constant $w>0$. This controller is similar to the one used in L. O. Chua, T. Yang$_1$ G-Q. Zhong and C. W. Wu, "Synchronization of Chua's Circuits with Time-Varying Channels and Parameters", *IEEE Transactions on Circuits and Systems*, Part I, vol. 43, no. 10, pp. 862–868, 1996.

Putting these pieces together, the state equations for the modulator-demodulator pair will look like:

$$\left.\begin{aligned} \dot{x} &= \alpha(y - x - f(c(t))) \\ \dot{y} &= x - y + z \\ \dot{z} &= -\beta y - \gamma z \\ f(x) &= bx + \frac{1}{2}(a - b)\,[|x+1| - |x-1|] \end{aligned}\right\} \text{Transmitter/modulator}$$

$$\dot{\tilde{x}} = \alpha(\tilde{y} - \tilde{x} - \kappa\tilde{u}(t))$$
$$\dot{\tilde{y}} = \tilde{x} - \tilde{y} + \tilde{z}$$
$$\dot{\tilde{z}} = -\beta\tilde{y} - \gamma\tilde{z}$$
$$f(\tilde{x}) = b\tilde{x} + \frac{1}{2}(a-b)\,[|\tilde{x}+1| - |\tilde{x}-1|]$$

Receiver/demodulator $$\dot{\kappa} = -w(\kappa\tilde{u} - f(\tilde{x}))\tilde{u},$$

where $\tilde{u}(t)$ is a noise-corrupted version of $u(t)=f(c(t))$ multiplied by the channel gain. The adaptive controller $\kappa=-w(\kappa \tilde{u}-f(\tilde{x}))\tilde{u}$ is used in the receiver only during the preamble period. In all other times, $\kappa$ is set to a constant. The constant used is derived from the most recent preamble period. In the preferred embodiment, the $\kappa$ in the adaptive controller during the last part of the preamble period is averaged to generate this constant.

Figure 5:
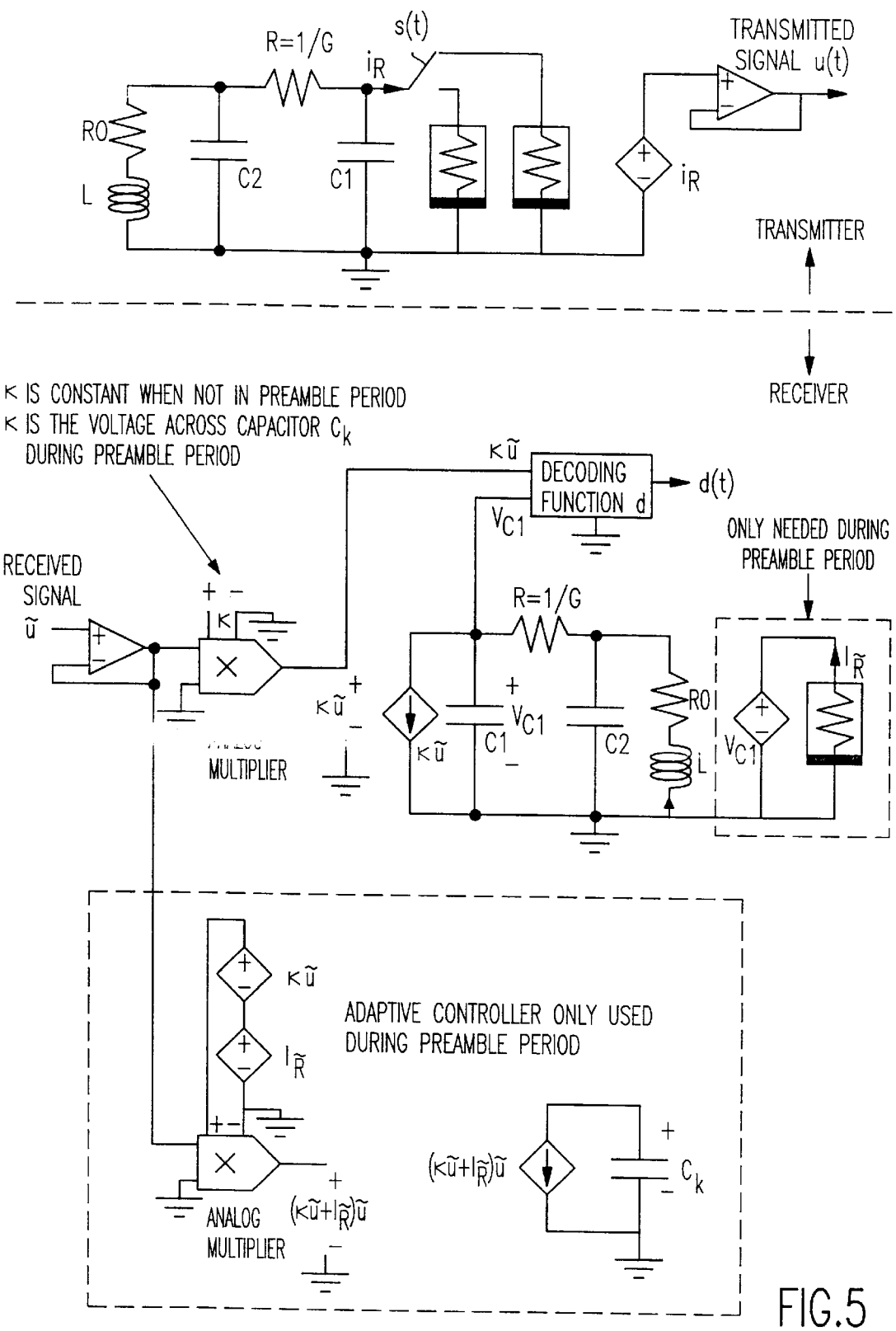
FIG. 5 is a schematic diagram of a specific implementation of a transmitter and receiver system according to the invention.

A circuit implementation of the modulator and demodulator is shown in FIG. 5, where the diamond shaped sources are controlled sources. In the transmitter, the information signal s(t) switches to one of the two nonlinear resistors, depending on whether s(t) is 1 or 0. The two nonlinear resistors have different parameter values. This is effectively the same as the parameters of the nonlinear resistor and, therefore, the parameters of the Chua's oscillator changing depending on s(t). This forms the perturbing unit in block 22 of FIG. 2.

The transmitter signal is the current through the nonlinear resistor which is a nonlinear function of the voltage $v_1$ across capacitor $C_1$. Note that $v_1$ is a state variable of the chaotic system. Since the parameter of the nonlinear resistor depends on s(t), u is a nonlinear function of $v_1$ and s(t).

In the receiver, the received signal $\tilde{u}$ is multiplied by the gain compensation parameter $\kappa$ via an analog multiplier. The resulting $\kappa\tilde{u}$ is then used as a current to drive a linear subcircuit identical to the one in the transmitter. This is how $\tilde{u}$ is used to perturb the Chua's oscillator.

The voltage across $C_1$ is fed along with $\kappa\tilde{u}$ to the decoding function block to generate d(t). During the preamble period, $\tilde{u}$ is also used to estimate the value of $\kappa$ used during non-preamble periods. The circuitry used for this estimation is enclosed by the dashed boxes in FIG. 5. The estimate is taken from the voltage across capacitor $C_\kappa$.

Figure 6:
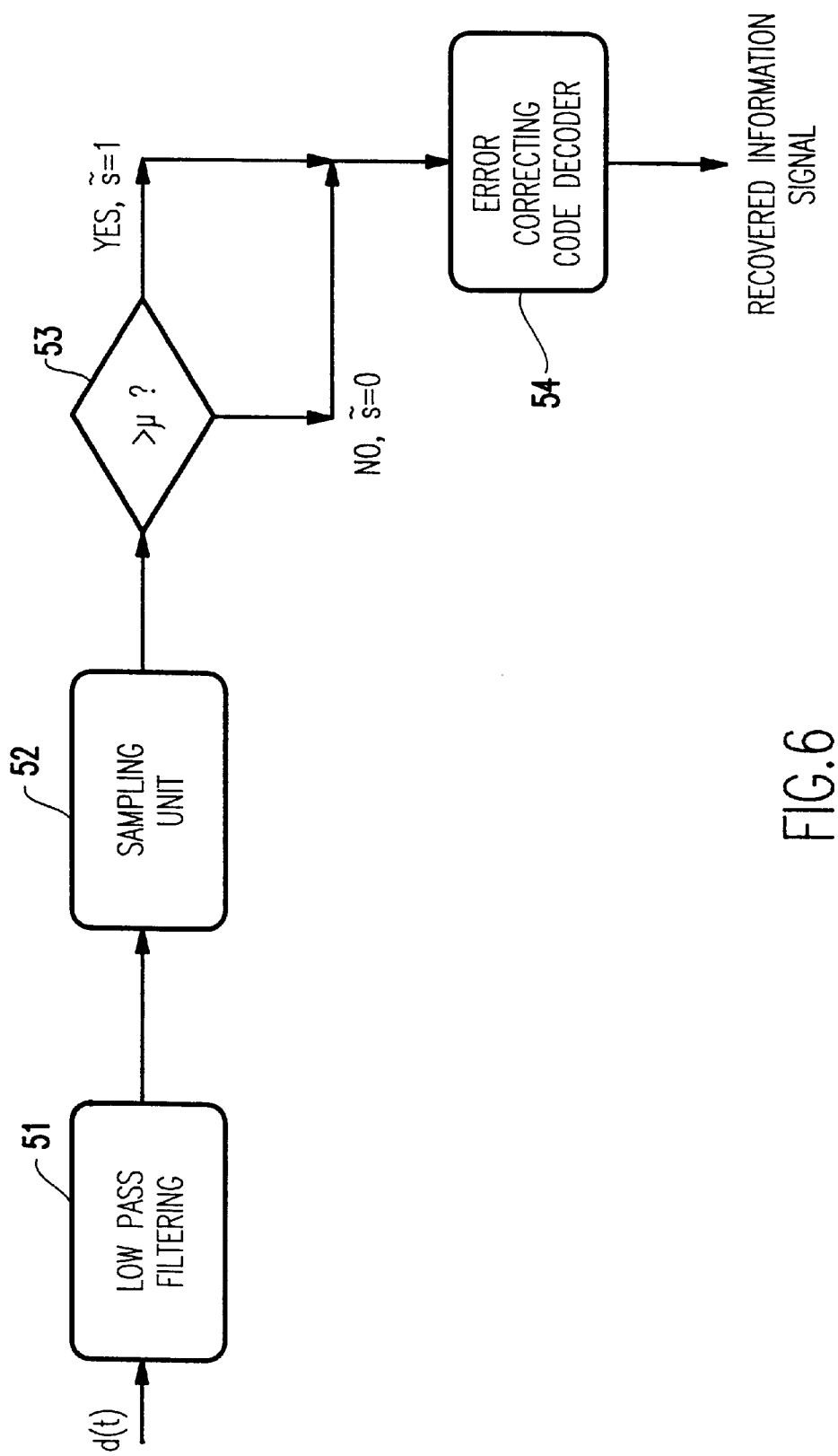
FIG. 6 is a flow diagram of the post-processing steps according to the invention.

Post-processing of d(t) consists of one or more of the following steps, as shown in FIG. 6. First, in function block 51 there is a filtering operation. The filter used is in general a low pass filter to remove high frequency noise and/or DC bias. The next step is recovering digital data from analog signals. In the preferred embodiment, the analog signal (after low pass filtering) is sampled at periodic intervals in function block 52 and compared to a threshold $\mu$ in decision block 53 to determine the recovered digital data. In the preferred embodiment, $\mu$ is chosen to be $0.5(s_0+s_1)$. If error correcting codes are used in the transmitter, the next step would be to do the corresponding decoding in function block 54.

Figure 7:
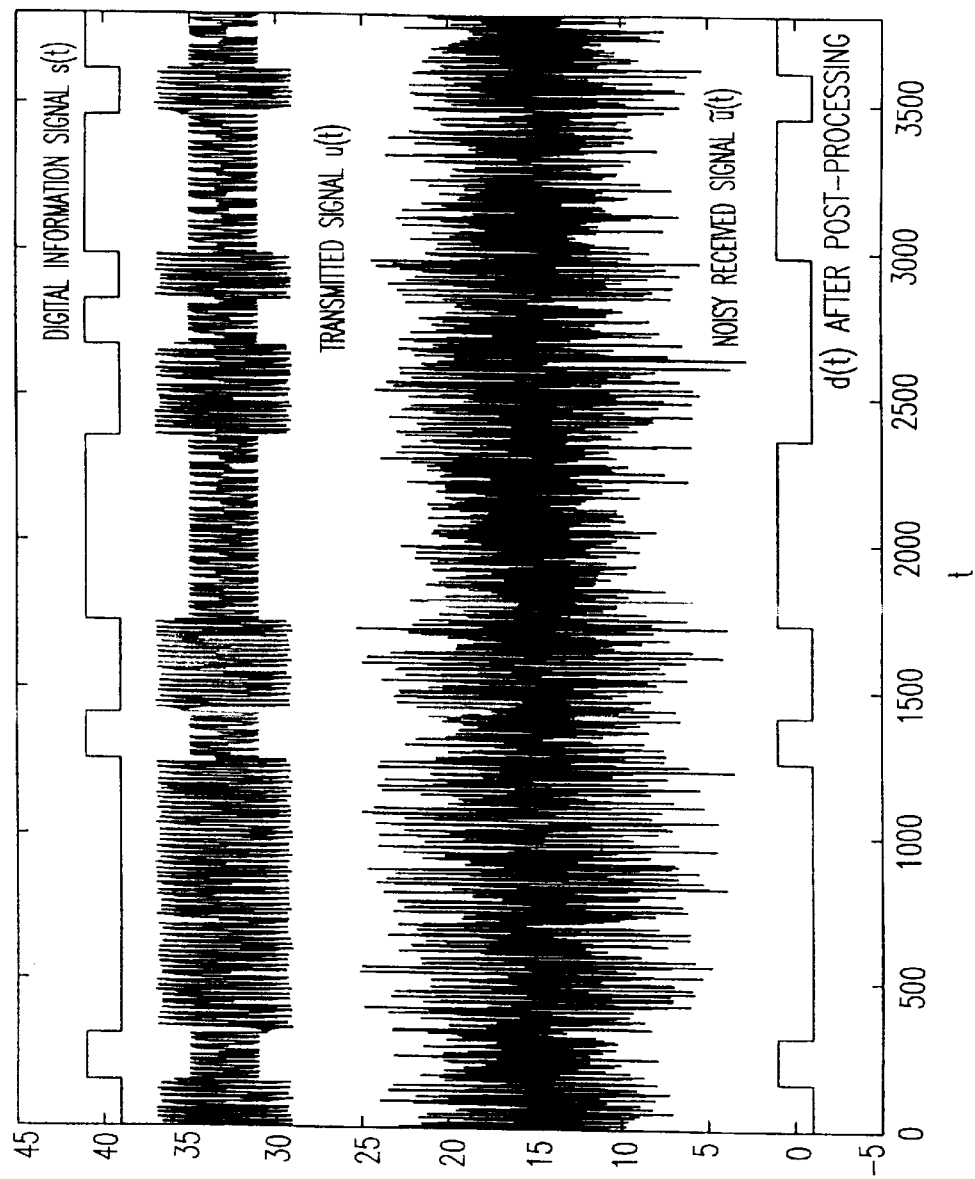
FIG. 7 is an oscillograph showing transmitted and received signals using the system shown in FIG. 5.

Referring to FIG. 7, where the waveforms are translated in the vertical axis for clarity, we illustrate the system in operation. The information signal s(t) is shown in the top waveform. The transmitted signal u(t) is shown in the second waveform. For illustrative purposes, delayed versions of u(t) (with two different delays) and additive white Gaussian noise are added to u(t) to obtain $\tilde{u}(t)$. This models the effects of channel noise and self-jamming. The signal $\tilde{u}(t)$ is shown in FIG. 7 as the third waveform. The bottom waveform of FIG. 7 shows the demodulated waveform d(t) after post-postprocessing, i.e., $\tilde{s}$ as seen in FIG. 6, is shown. The channel gain is assumed to be one in this case. The signal s(t) is almost fully recovered under such realistic conditions. To ensure perfect transmission, s(t) will be a codeword from an error-correcting code, coded using the original information signal. In spite of small differences between s and $\tilde{s}$, we can still recover the original information signal after decoding of the error-correcting code in function block 54.

Figure 8:
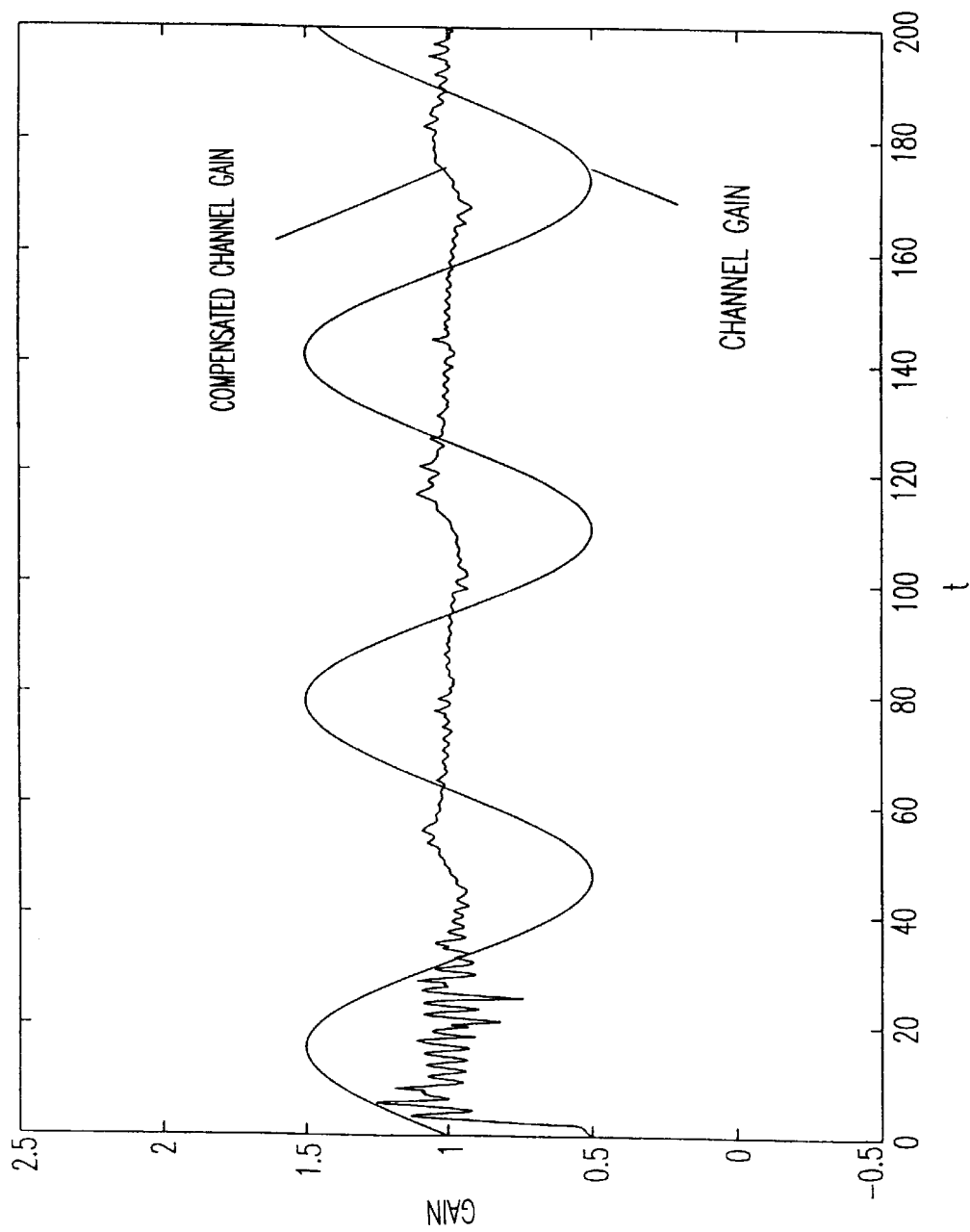
FIG. 8 is an oscillograph showing the operation of the adaptive controller for compensating for channel gain during the preamble period.

Referring to FIG. 8, where we illustrate the operation of the adaptive controller for compensating for channel gain during the preamble period. If the channel gain is h(t), then $\tilde{u}(t)=h(t)u(t)$ for the case when there are no other channel disturbances. In FIG. 8, the gain of the channel h(t) is a sinusoidal waveform. Ideally, we want the compensated channel gain to be one. Suppose that the preamble sequence is the zero sequence, then the compensated channel gain $\kappa(t)h(t)$ (with w=5) is shown in FIG. 8 which fluctuates slightly around one.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for communicating a message signal from a first location to a second location, said first and second locations being linked by a communication channel such that the signal is subject to disturbances such as noise, jamming, gain modulation, and multipath interference, the system being based on synchronization of dynamical systems and comprising:

a transmitter dynamical system x'=f(x) generating signals x(t) with prescribed characteristics;

an encoder for and combining an information signal s(t) with x(t) to produce an encoded signal c(t)=c(s(t),x(t));

a transmitter perturbing unit which changes the dynamical system x'=f(x) according to c(t) into a system x'=g(f(x),c(t));

a function transforming unit h which maps c(t) into a function u(t)=h(c(t));

a transmitter for sending u(t) to a receiver;

a receiver having a dynamical system $\tilde{x}'=f(\tilde{x})$ generating signals $\tilde{x}$ which are similar to x(t);

a receiver perturbing unit which changes the dynamical system $\tilde{x}'=f(\tilde{x})$ according to u(t) into $\tilde{x}'=g(f(\tilde{x}),u(t))$; and a decoder, d, which decodes the transmitted signal u(t) using $\tilde{x}$, wherein $d(t)=d(u(t),\tilde{x})$ such that d(t) approximates s(t), so the information in s(t) can be recovered from d(t).

2. The communication system recited in claim 1 wherein the encoder codes the information signal s(t) with an error correcting code prior to combining with the signal x(t) and the decoder uses the error correcting code to correct errors in the recovered information signal s(t).

3. The communication system recited in claim 1 wherein the receiver further includes adaptive controllers for estimating and compensating for changes in the communication channel, the adaptive controllers being used only when the transmitter is transmitting a preamble sequence, the output of the adaptive controllers providing an input to the receiver compensating for changes in channel parameters during times when the transmitter is not transmitting a preamble sequence.

4. The communication system recited in claim 1 wherein the transmitter and receiver perturbing units are chaotic oscillators.

5. A transmitter system for a communication system based on synchronization of dynamical systems which can resist noisy transmission channels, jamming, gain modulation, and multipath interference, the transmitter system comprising:

- a transmitter dynamical system $x'=f(x)$ generating signals $x(t)$ with prescribed characteristics,
- an encoder for and combining an information signal $s(t)$ with $x(t)$ to produce an encoded signal $c(t)=c(s(t),x(t))$;
- a transmitter perturbing unit which changes the dynamical system $x'=f(x)$ according to $c(t)$ into a system $x'=g(f(x),c(t))$;
- a function transforming unit h which maps $c(t)$ into a function $u(t)=h(c(t))$; and
- a transmitter for sending $u(t)$ to a receiver.

6. The transmitter system recited in claim 5 wherein the encoder codes the information signal $s(t)$ with an error correcting code prior to combining with the signal $x(t)$.

7. The transmitter system recited in claim 5 wherein the transmitter perturbing unit is a chaotic oscillator.

8. A receiver system for a communication system based on synchronization of dynamical systems which can resist noisy transmission channels, jamming, gain modulation, and multipath interference, the receiver system comprising:

- a receiver having a dynamical system $\tilde{x}'=f(\tilde{x})$ generating signals $\tilde{x}$ which are similar to signals $x(t)$ generated by a transmitter dynamical system $x'=f(x)$;
- a receiver perturbing unit which changes the dynamical system $\tilde{x}'=f(\tilde{x})$ according to a transmitted signal $u(t)$ into $\tilde{x}'=\tilde{g}(f(\tilde{x}),u(t))$; and
- a decoder, d, which decodes the transmitted signal $u(t)$ using $\tilde{x}$, wherein $d(t)=d(u(t)\tilde{x})$ such that $d(t)$ approximates an information signal $s(t)$, so the information in $s(t)$ can be recovered from $d(t)$.

9. The receiver system recited in claim 8 wherein the receiver perturbing unit is a chaotic oscillator.

* * * * *